(No Model.)
A. J. HOFMANN.
CUTTER AND GRATER FOR VEGETABLES.
No. 560,715. Patented May 26, 1896.
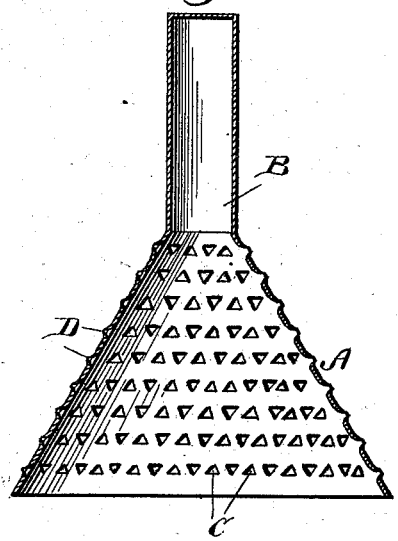
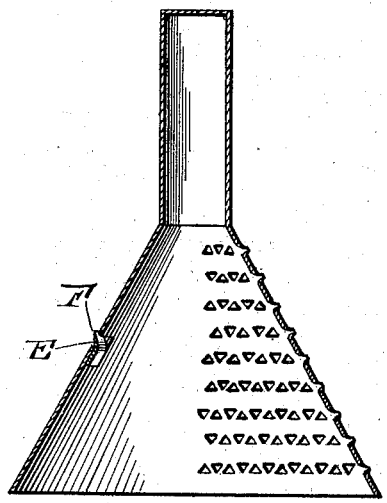
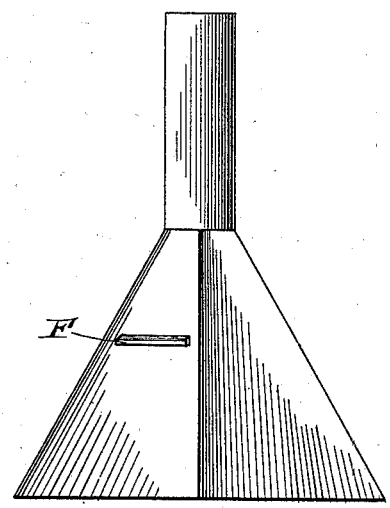
WITNESSES:
INVENTOR
Adam J. Hofmann
BY
Edgar Tate & Co
ATTORNEYS

UNITED STATES PATENT OFFICE.

ADAM J. HOFMANN, OF NEW YORK, N. Y.

CUTTER AND GRATER FOR VEGETABLES.

SPECIFICATION forming part of Letters Patent No. 560,715, dated May 26, 1896.

Application filed July 10, 1895. Serial No. 555,470. (No model.)

*To all whom it may concern:*

Be it known that I, ADAM J. HOFMANN, a citizen of the United States, and a resident of New York, county of New York, and State of New York, have invented certain new and useful Improvements in Cutters or Graters for Vegetables, of which the following is a specification, reference being had to the accompanying drawings, forming a part thereof, in which similar letters of reference indicate corresponding parts in all the figures.

This invention relates to household utensils, and the object thereof is to produce a grater which may be used for grating nutmegs, dried fruits, corn, potatoes, or other articles, and which may also be used for cutting or slicing various products—such as potatoes, cabbage, &c.

The invention is fully disclosed in the following specification, of which the accompanying drawings form a part, and in which—

Figure 1 is a central vertical section of my improved grater or vegetable-cutter; Fig. 2, a similar view of a modification; and Fig. 3, an elevation of the same, showing one form in which it may be made.

In the practice of my invention I provide a conical device A, which is formed of sheet metal of any desired kind, but preferably from metal that will not corrode or be injuriously affected by acids, water, or other elements, and the upper part of which is provided with a vertical extension B, which constitutes a handle for the device.

In practice I may provide the entire area of the conical base A with perforations C, which are formed in the usual manner with this class of devices, being punched through from the inner side by properly-constructed stamps or other implements, so that the outer surface is provided with sharp cutting points or projections D, and in operation the device is held in a plate, pan, or other vessel, and the article to be grated, powdered, or cut is rubbed over the outer surface thereof in a manner well understood, when the powdered or divided product will fall through the perforations C within the base of the grater or cutter.

In Fig. 2 I have shown another form of my improvement, in which but one side thereof is provided with the perforations and the cutting points or edges, and the other side of which is provided with a transverse slot E, in which is placed a transverse blade F, having a sharp cutting edge, and which may be secured in position in any desired manner. This form of construction is designed to be used for the purposes hereinbefore described with reference to Fig. 1 and also for the purpose of slicing or cutting the various vegetables—such as potatoes, cabbage, apples, and other articles of this class—and the operation thereof will be readily understood without further description.

It is evident that the base A may be of any desired form, either conical, pyramidal, or square, and in Fig. 3 I have shown a form of my improved grater or vegetable-cutter in which the base is pyramidal and composed of four sides, and either of these sides may be provided with a cutting-knife F, as shown in Fig. 2, and the remaining sides may be provided with perforations and cutting-points, as shown in Figs. 1 and 2, or with any preferred form of cutting or grating devices capable of being used in the manner described.

It will thus be seen that I accomplish the object of my invention by means of a device which is simple in construction and operation and which is perfectly adapted to accomplish the results for which it is intended.

Having fully described my invention, I claim and desire to secure by Letters Patent—

An article of manufacture, a combined grater and slicer, composed of the conical portion or base provided with perforations and irregular cutting projections around the outside of the same, a transverse slot in said conical portion, a curved cutting-blade secured within said slot, so that the thickness of the slices to be cut can be regulated and a cylindrical extension secured upon the upper part of said conical portion to form a handle for said device, substantially as herein described.

In testimony that I claim the foregoing as my invention I have signed my name, in presence of two witnesses, this 9th day of July, 1895.

ADAM J. HOFMANN.

Witnesses:
L. M. MULLER,
M. A. KNOWLES.